Patented Dec. 18, 1951

2,579,420

UNITED STATES PATENT OFFICE 2,579,420

METHOD FOR PRODUCING 6-HALO-8-HYDROXYCINCHONINIC ACIDS

Robert F. Coles, Easton, Pa., assignor to General Aniline & Film Corporation, New York, N. Y., a corporation of Delaware No Drawing. Application April 18, 1950,
Serial No. 156,720

8 Claims. (Cl. 260—279)

This invention relates to 6-halo-8-hydroxycinchoninic acids and particularly to a process of preparing the same.

It is known that a halogen group in the sixth position of the quinoline nucleus may be hydrolyzed at elevated temperatures and pressures, in the presence of strong alkali, to yield a 6-hydroxycinchoninic acid. For example, in German Patent 489,458, 2 - phenyl-6-hydroxy- and 2-phenyl-6-aminocinchoninic acids have been prepared by autoclave hydrolysis of 2-phenyl-6-bromocinchoninic acid.

Halogenated 8-hydroxyquinolines have been prepared by the conventional method of cyclization of the appropriate o-aminophenol. This method when used for the formation of 6-halo-8-hydroxycinchoninic acids, however, is of little merit due to the poor yields obtained and the expensive starting materials employed.

6-halo-8-hydroxycinchoninic acids are extremely valuable as color formers for the production of magneta phenazonium dyestuff images by color development of an exposed silver halide emulsion with 2,4-diamino-aniline developers.

Accordingly, it is an object of the present invention to provide a process of preparing such 6-halo-8-hydroxycinchoninic acids.

I have found that 6-halo-8-hydroxycinchoninic acids are readily obtainable in good yields from 6,8-dihalocinchoninic acids (i. e., dicholoro, dibromo, and cholorobromo) by a selective hydrolysis of the halogen in the 8-position of the quinoline ring by a proper selection af alkali concentration and temperature. Unless the two factors of alkali concentration and temperature are properly correlated, it is impossible to achieve the selective hydrolysis, and the reaction, in fact, may yield 6,8-dihydroxycinchoninic acid as the sole product.

The compounds obtained by the foregoing process steps are characterized by the following general formulae:

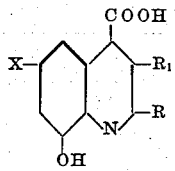

and

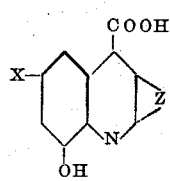

wherein R represents an allyl or lower alkyl group, e. g., methyl, ethyl, propyl, isopropyl, and the like, an aryl group, e. g., phenyl, naphthyl, etc., or a heterocyclic group, e. g., thienyl, furyl, pyrryl, and the like, $R_1$ represents either hydrogen, allyl, or lower alkyl of the same value as in R, Z represents the atoms necessary to complete a carbocyclic ring system of 5 to 8 carbon atoms, e. g., trimethylene, tetramethylene, methyl substituted trimethylene, benzotrimethylene, benzotetramethylene naphthotetramethylene, and the like, and X represents a halogen, e. g., bromine or chlorine. Said lower alkyl, aryl, and heterocyclic radicals given as values for R may be substituted by any alkali insensitive groups, such as alkyl, e. g., methyl, ethyl, propyl, etc., aryl, e. g., phenyl, naphthyl, etc., alkoxy, e. g., methoxy, ethoxy, propoxy, etc., aryloxy, e. g., phenoxy, naphthoxy, etc., nitro, and the like.

To obtain compounds characterized by the foregoing formulae, 6,8-dihalocinchoninic acids are selectively hydrolyzed by heating a mixture of the acid in an aqueous solution of an alkali metal hydroxide or carbonate, such as sodium, potassium, or lithium hydroxide or carbonate, or an aqueous solution of an alkaline earth hydroxide, such as barium, calcium, or strontium of 5 to 20% concentration in an amount corresponding to at least three chemical equivalents per chemical equivalent of 6,8-dihalocinchoninic acid at a temperature ranging from 145° C. to 175° C., in the presence of a catalytic amount of a copper catalyst until solution occurs. After filtering the reaction mixture, the filtrate is acidified with acetic acid and the crude product collected. The product may be purified by crystallization from acetic acid or mixtures of dimethylformamide and acetic acid.

It is to be noted that the initial reaction, when placed in a heating vessel, such as, for example, an autoclave, is a grayish-white slurry (dihalocinchoninic acid in the form of its insoluble alkali metal salt). When hot samples are taken from the blowleg of the autoclave, a colored mixture is obtained during hydrolysis (due to the formation of the alkali metal salt of the phenol) which as the reaction nears completion is transformed to a complete solution (dialkali metal salt of 6-halo-8-hydroxycinchoninic acid which is soluble in the aqueous alkali of the reaction mixture). The reaction is stopped, i. e., the heating discontinued, soon after substantially complete solution occurs to avoid hydrolysis of the second halogen.

The copper catalyst employed is any copper salt, such as cuprous or cupric chloride, sulfate, etc., or mixture of a copper salt and copper powder. The catalytic amount of copper component is an arbitrary small amount and may range from 0.1 gram to 1 gram per 100 grams of the free acid.

Radical deviations from the above optimum conditions of alkali concentration and temperature or combinations of the two reduce the selectivity of the hydrolysis and yield 6,8-dihydroxycinchoninic acids as the sole products. For example, by increasing the temperature from 150° to 175° C. and the heating continued beyond the stage at which solution occurs, 6,8-dihydroxycinchoninic acids are obtained as the sole products.

The 6,8-dihalocinchoninic acids utilized in the selective hydrolysis reaction are obtained by treating a 5,7-dihaloisatin (i. e., dichloro, dibromo, and chlorobromo) with a hot aqueous alkali solution, of the same concentration and amount as above with stirring. As soon as the conversion to the yellow alkali salt of the corresponding isatinic acid is completed, the stirred mixture is then treated, while heating at near reflux with slightly more than an equivalent amount of an α-ketomethylene compound. After heating for a period of 4 to 12 hours, the reaction mixture is cooled, brine added if necessary to complete the precipitation, and the sodium salt of the cinchoninic acid collected. The product is dissolved in hot water, charcoaled, and filtered. Acidification of the filtrate with acetic acid precipitates the product in a high state of purity usually in about 90–97% yields.

As examples of α-ketomethylene compounds which are condensed with the substituted or unsubstituted 5,7-dihaloisatinic acids, the following are illustrative:

(1) $CH_3COCH_3$
Acetone (2) $CH_3CH_2COCH_3$
Ethylmethylketone (3) $CH_3COCH_2CH_2CH_3$
Methylpropylketone (4) $(CH_3)_2CHCOCH_3$
Isopropylmethylketone (5) $CH_2=CHCH_2COCH_3$
Allylacetone (6) 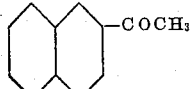
Cyclopentanone (7) 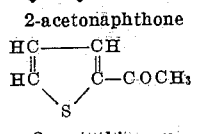
Cyclohexanone (8) 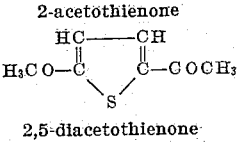
2,3,3-trimethylcyclopentanone (9) 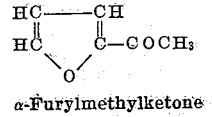
Benzylphenylketone

(10) 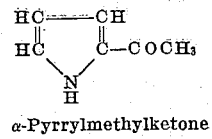
α-Tetralone

(11) 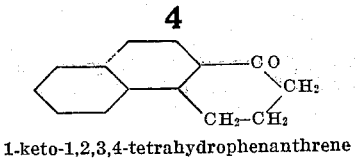
1-keto-1,2,3,4-tetrahydrophenanthrene

(12) $C_6H_5COCH_3$
Acetophenone

(13) $C_6H_5CH_2COCH_3$
Benzylmethylketone

(14) 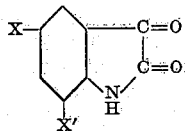
2-acetonaphthone

(15) $\begin{array}{c}HC\!\!\!-\!\!\!-\!\!\!-CH\\ \|\quad\quad\|\\ HC\quad\;\;C\!-\!COCH_3\\ \diagdown S\diagup\end{array}$
2-acetothienone

(16) $\begin{array}{c}HC\!\!\!-\!\!\!-\!\!\!-CH\\ \|\quad\quad\|\\ CH_3CO\!-\!C\quad\;\;C\!-\!COCH_3\\ \diagdown S\diagup\end{array}$
2,5-diacetothienone

(17) $\begin{array}{c}HC\!\!\!-\!\!\!-\!\!\!-CH\\ \|\quad\quad\|\\ HC\quad\;\;C\!-\!COCH_3\\ \diagdown O\diagup\end{array}$
α-Furylmethylketone

(18) $\begin{array}{c}HC\!\!\!-\!\!\!-\!\!\!-CH\\ \|\quad\quad\|\\ HC\quad\;\;C\!-\!COCH_3\\ \diagdown N\diagup\\ H\end{array}$
α-Pyrrylmethylketone The substituted and unsubstituted 5,7-dihaloisatins which are condensed with an α-ketomethylene compound are characterized by the following general formula:

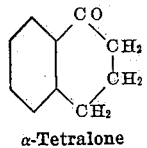

wherein X and X' each represent a halogen, such as chlorine or bromine.

As illustrative examples of such 5,7-dihaloisatins, the following may be mentioned:

5-chloro-7-bromoisatin
5,7-dichloroisatin
5,7-dibromoisatin

In lieu of the α-ketomethylene compounds referred to above, one may employ any α-ketomethylene compound capable of undergoing the Pfitzinger reaction, which involves the condensation of isatin under the influence of basic reagents, such as alkali metal hydroxides or carbonates to yield a ring expansion product containing a 6-membered nitrogen heterocyclic bearing a carboxyl group in the 4-position with respect to nitrogen and other substituents in the 2- and 3-positions depending on the nature of the α-ketomethylene compound. In other words, any α-ketomethylene compound in which the group, such as hydrogen, alkyl, aryl, heterocyclic or the like, adjacent to the methylene group does not exert an inhibiting effect upon the methylene group may be employed. Compounds of this type, including those containing alkali insensitive substituents in the alkyl, aryl, and heterocyclic portions, are legion and no difficulty will be encountered in selecting them for the purpose of the present invention.

Instead of isolating the 6,8-dihalocinchoninic acids prepared by the condensation of a substituted or unsubstituted 5,7-dihaloisatin with an α-ketomethylene compound, the 6-halo-8-hydroxycinchoninic acid is readily obtained directly in a one-step process by heating a mixture of the α-ketomethylene compound and an equimolar amount of the substituted or unsubstituted 5,7-dihaloisatin in 5-20% of an aqueous alkali in an amount corresponding to at least three chemical equivalents per chemical equivalent of an isatin at a temperature ranging from 50-120° C. in the presence of a catalytic amount of an aqueous solution of a copper salt containing copper powder until the conversion to the dihalocinchoninic acid is complete, the time ranging usually from 4-12 hours. The reaction mixture is treated by the selective hydrolysis procedure given above, i. e., at a temperature from 145-175° C. until solution occurs. The product is isolated by acidification of the filtrate of the reaction mixture.

It is to be observed that in the first reaction, the ring expansion of the 5-chloro-7-bromo-isatin is carried out at milder temperatures, i. e., from 50-120° C., while in the second reaction, selective hydrolysis is carried out at higher temperatures, i. e., from 145-170° C. The copper catalyst may be added during the first or second reaction.

With 5-chloro-7-bromoisatin and acetophenone, the reaction involved in the preparation of (1) the 6-chloro-8-bromocinchoninic acid, and (2) the selective hydrolysis thereof to 6-chloro-8-hydroxycinchoninic acid, may be represented as follows:

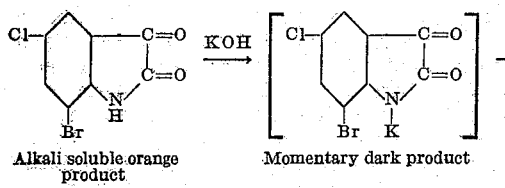

(1) Alkali soluble orange product — Momentary dark product

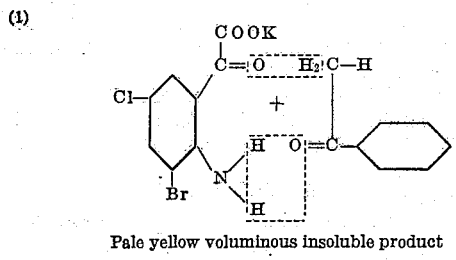

(2) Pale yellow voluminous insoluble product

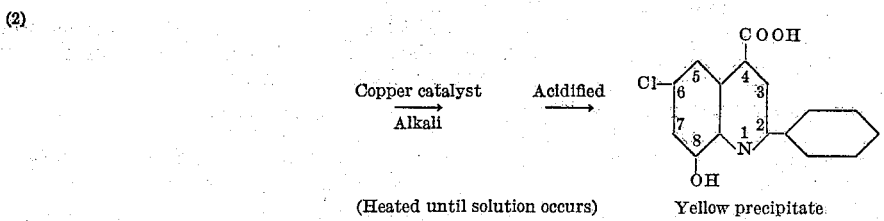

(Heated until solution occurs) — Yellow precipitate

It is to be noted that the substituent other than hydrogen, i. e., lower alkyl, in the 3-position of the 8-hydroxycinchoninic acid nucleus will depend upon the structure of the α-ketomethylene compound. If the latter compound is asymmetrical and contains two α-methylene groups attached to the carbonyl group, two isomers are generally formed by reason of the reaction of the two methylene groups, respectively. For example, with 6-chloro-8-bromocinchoninic acid and ethylmethylketone, a mixture of two isomers, 2,3-dimethyl-6-chloro-8-hydroxy- and 2-ethyl-6-chloro-8-hydroxycinchoninic acids, may be formed with a predominating amount of the former.

The following examples describe in detail the manner in which the 6,8-dihalocinchoninic acids, the selective hydrolysis of such acids, and the 8-hydroxy derivatives thereof are obtained by a one-step process. These examples are included for purposes of illustration only and are not intended to be construed as limitative.

EXAMPLE I

*2-phenyl-6-chloro-8-bromocinchoninic acid*

5-chloro-7-bromoisatin is treated with hot 10% aqueous sodium hydroxide in the ratio of 1 gram to 10 grams, respectively, to form the salt of the corresponding isatinic acid. The mixture is then heated at near reflux with slightly more than an equivalent amount of acetophenone. After heating for 4 to 6 hours, the reaction mixture was cooled, brine added if necessary to complete the precipitation and the sodium salt of the 5-chloro-7-bromocinchoninic acid collected. The product is dissolved in hot water, charcoaled, and filtered. Acidification of the filtrate with acetic acid precipitates the product in a high state of purity.

EXAMPLE II

*2-propyl-6-chloro-8-bromocinchoninic acid*

Example I was repeated with the exception that acetophenone was replaced by slightly more than an equivalent amount of methylpropylketone.

EXAMPLE III

*2-methyl-6-chloro-8-bromocinchoninic acid*

Example I was again repeated with the exception that the acetophenone was replaced by slightly more than an equivalent amount of acetone.

By replacing the α-ketomethylene compounds of the above examples with ethylmethylketone, 2-acetonaphthone, cyclohexanone, and 2-acetothienone, respectively, the following acids were prepared in the same manner as above:

2,3-dimethyl-6-chloro-8-bromocinchoninic acid
2 - (β - naphthyl) - 6 - chloro - 8 - bromocinchoninic acid
1,2,3,4 - tetrahydro - 5 - bromo - 7 - chloro - 9 - carboxyacridine
2-(α-thienyl)-6-chloro-8-bromocinchoninic acid

EXAMPLE IV

*2-phenyl-6-chloro-8-hydroxycinchoninic acid*

A mixture of 2-phenyl-6-chloro-8-bromocinchoninic acid prepared according to Example I and 10% aqueous sodium hydroxide in the ratio of 1 gram to 10 grams, respectively, is treated with an arbitrarily small amount of copper sulfate (about 1 gram to 100 grams of starting material) dissolved in water plus a small amount of copper powder. The mixture is then heated in an autoclave at 150° C. for about 5 hours. After filtering the reaction mixture, the filtrate is acidified with acetic acid and the crude product collected and dissolved by crystallization from acetic acid.

EXAMPLE V

*2-propyl-6-chloro-8-hydroxycinchoninic acid*

Example IV was repeated with the exception that 2-phenyl-6-chloro-8-bromocinchoninic acid was replaced by 2-propyl-6-chloro-8-bromocinchoninic acid.

EXAMPLE VI

*2-methyl-6-chloro-8-hydroxycincroninic acid*

Example IV was again repeated with the exception that 2-phenyl-6-chloro-8-bromocinchoninic acid was replaced by 2-methyl-6-chloro-8-bromocinchoninic acid.

EXAMPLE VII

*1,2,3,4-tetrahydro-5-hydroxy-7-chloro-9-acridinecarboxylic acid*

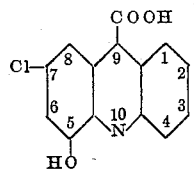

A mixture of 1,2,3,4-tetrahydro-5-hydroxy-7-chloro-9-acridinecarboxylic acid and 10% aqueous sodium hydroxide in the ratio of 1 gram to 10 grams, respectively, is treated with copper sulfate in an amount equivalent to 0.1 to 1.0 gram per 100 grams of the starting material dissolved in water containing a small amount of suspended copper powder. The mixture is then heated in an autoclave at 150° C. for about 4 to 6 hours. After filtering the reaction mixture, the filtrate is acidified with acetic acid, the crude product collected and purified by crystallization from acetic acid.

By replacing the 2-methyl-, 2-propyl-, and 2-phenyl-6-chloro-8-bromocinchoninic acids of Examples IV to VI with 2,3-dimethyl- and 2-(β - naphthyl) - 6 - chloro - 8 - hydroxycinchoninic acids, the following 8-hydroxy derivatives were prepared in the same manner as above.

2,3 - dimethyl - 6 - chloro - 8 - hydroxycinchoninic acid
2 - (β - naphthyl) - 6 - chloro - 8 - hydroxycinchoninic acid
1,2,3,4 - tetrahydro - 5 - hydroxy - 7 - chloro - 9-carboxyacridine
2 - (α - thienyl) - 6 - chloro - 8 - hydroxycinchoninic acid.

The following examples will illustrate the preparation of 2-, and 2,3-substituted and unsubstituted 6-chloro-8-hydroxy-cinchoninic acids by a one-step process. The general reaction of Examples I to III is carried out as described. However, the reaction mixture without isolation of the intermediate is treated with aqueous copper sulfate containing a suspension of copper powder and heated at 150° C. for 4 to 6 hours in an autoclave and the product obtained is then treated by following the procedures of Examples IV to VII.

EXAMPLE VIII

*2-phenyl-6-chloro-8-hydroxycinchoninic acid*

A stirred suspension of 208 grams of 5-chloro-7-bromoisatin in 1 liter of hot water is treated with 1000 grams of 10% aqueous sodium hydroxide. As soon as the conversion to the yellow sodium salt of the corresponding isatinic acid is complete, the mixture is heated at 80–95° C. and 96 mls. of acetophenone added and the heating continued for about 1 to 2 hours. The solid dissolves and an oil separated which is converted to a flocculent white solid after about 2 hours. A probe of the reaction mixture is taken and acidified with hot hydrochloric acid. The sample is collected, dried, and placed in a melting point bath at 270° C. When the sample melts at 272–275° C. the reaction is complete. The reaction mixture is then treated with about 1 to 2 grams of copper sulfate dissolved in water together with a small quantity of copper powder and the mixture heated for 4 hours at 150° C. The hydrolyzed solution is cooled to room temperature, filtered, and the filtrate acidified with acetic acid. The solid is collected, washed with water, and extracted with 2 liters of boiling 2 N hydrochloric acid. After filtering the hot mixture and washing the filter cake, the solid is treated in 3 liters of hot water by the addition of sufficient 10% aqueous sodium hydroxide until solution is effected. The solution is acidified with acetic acid and the solid collected. The product is purified by crystallization from acetic acid to yield 70–80% of a final product.

EXAMPLE IX

*2-(α-thienyl)-6-chloro-8-hydroxycinchoninic acid*

Example VIII was repeated with the exception that 96 mls. of acetophenone were replaced by 100 grams of 2-acetothienone.

EXAMPLE X

*3',4'-dihydronaphtho-[1',2',1,2]-6-chloro-8-hydroxycinchoninic acid*

Example VIII was again repeated with the exception that 96 mls. of acetophenone were replaced by 117 grams of α-tetralone.

The above examples demonstrate the methods of selectively hydrolyzing 6-chloro-8-bromocinchoninic acids to the corresponding 6-chloro-8-hydroxycinchoninic acid. These examples merely illustrate some preferred embodiments of my invention since it is obvious that 5,7-dihaloisatins and 6-dihalo-8-hydroxycinchoninic acids other than 5-chloro-7-bromoisatins and 6- chloro-8-bromocinchoninic acids and α-keto-methylene compounds may be used.

By the term "halo" as used herein and in the appended claims, it is to be understood that such term includes only the 5,7-dichloro, 5,7-dibromo, and 5-chloro-7-bromo when applied to isatins, and that the term "dihalo" includes only 6,8-dichloro, 6,8-dibromo, and 6-chloro-8-bromo when applied to the cinchoninic acids.

I claim:

1. The process of selectively hydrolyzing 6,8-dihalocinchoninic acids into 6-halo-8-hydroxycinchoninic acids which comprises heating a 6,8-dihalocinchoninic acid in an aqueous solution of an alkali of 5 to 20% concentration selected from the group consisting of alkali metal hydroxides and carbonates and alkaline earth hydroxides in an amount corresponding to at least three chemical equivalents per chemical equivalent of free 6,8-dihalocinchoninic acid at a temperature ranging from 50° to 175° C., in the presence of a copper catalyst until solution of the dialkali metal salt of 6-halo-8-hydroxycinchoninic acid is effectuated, acidifying the alkaline solution and collecting the solid product.

2. The process of converting 5,7-dihaloisatins into 6-halo-8-hydroxycinchoninic acids which comprises heating in the presence of a copper catalyst a 5,7-dihaloisatin in an aqueous solution of an alkali of 5 to 20% concentration selected from the group consisting of alkali metal hydroxides and carbonates and alkaline earth hydroxides in an amount corresponding to at least three chemical equivalents per chemical equivalent of 5,7-dihaloisatin at a temperature ranging from 50° to 120° C. for a period of time ranging from 4 to 12 hours, heating the resulting reaction mixture at a temperature ranging from 145° to 175° C. until the alkali salt of the dihalocinchoninic acid contained therein is hydrolyzed and solution of the resulting dialkali metal salt of 6-halo-8-hydroxycinchoninic acid is effectuated, acidifying the reaction mixture and collecting the solid product.

3. The process of preparing 6-halo-8-hydroxycinchoninic acids selected from the group consisting of those of the following formulae:

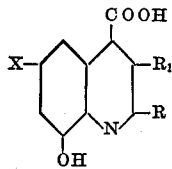

and

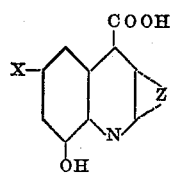

wherein R represents a member selected from the class consisting of allyl, lower alkyl, aryl, and 5-membered monocyclic heterocyclic radical containing a single hetero atom selected from the group consisting of oxygen, sulfur, and nitrogen, R₁ is a member selected from the class consisting of hydrogen, allyl, and lower alkyl, X represents a halogen, and Z represents the atoms necessary to complete a carboxylic ring system of 5 to 8 carbon atoms, which comprises heating 6,8-dihalocinchoninic acid in an aqueous solution of an alkali of 5 to 20% concentration selected from the group consisting of alkali metal hydroxides and carbonates and alkali eath metal hydroxides in an amount corresponding to at least three chemical equivalents per chemical equivalent of free 6,8-dihalocinchoninic acid at a temperature ranging from 50° to 175° C. in the presence of a copper catalyst until solution of the dialkali metal salt of 6-halo-8-hydroxycinchoninic acid is effectuated, acidifying the alkaline solution and collecting the solid product.

4. The process according to claim 1 wherein the cinchoninic acid heated in an aqueous alkali solution is 2-propyl-6-chloro-8-bromocinchoninic acid.

5. The process according ot claim 1 wherein the cinchoninic acid heated in an aqueous alkali solution is 2-phenyl-6-chloro-8-bromocinchoninic acid.

6. The process according to claim 1 wherein the cinchoninic acid heated in an aqueous alkali solution is 2-methyl-6-chloro-8-bromocinchoninic acid.

7. The process according to claim 1 wherein the cinchoninic acid heated in an aqueous alkali solution is 2-(β-naphthyl)-6-chloro-8-bromocinchoninic acid.

8. The process according to claim 1 wherein the cinchoninic acid heated in an aqueous alkali solution is 1,2,3,4-tetrahydro-5-hydroxy-7-chloro-9-acridinecarboxylic acid characterized by the following formula:

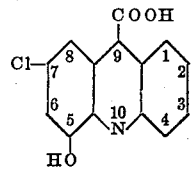

ROBERT F. COLES.

REFERENCES CITED

The following references are of record in the file of this patent:

UNITED STATES PATENTS

| Number | Name | Date |
|---|---|---|
| 2,082,358 | Schlichenmaier et al. | June 1, 1937 |

FOREIGN PATENTS

| Number | Country | Date |
|---|---|---|
| 362,539 | Germany | Oct. 28, 1922 |
| 506,349 | Germany | May 18, 1932 |

OTHER REFERENCES

Buu-Hoi: J. Chem. Soc. (London) 1946, pp. 795–797.